Nov. 5, 1935.  S. H. HUNT  2,020,186
SHIPPING BASKET
Filed Nov. 2, 1933
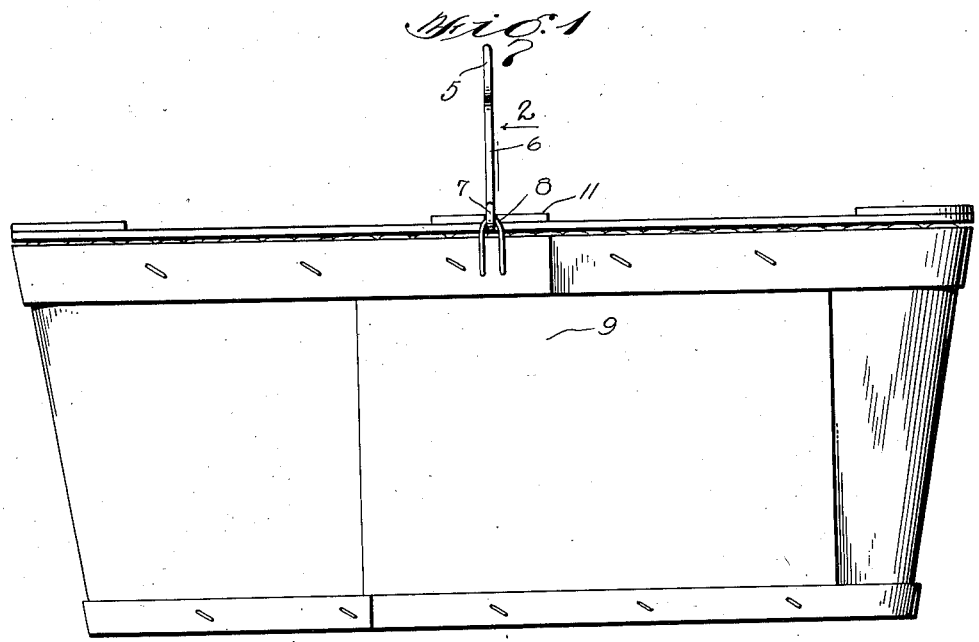
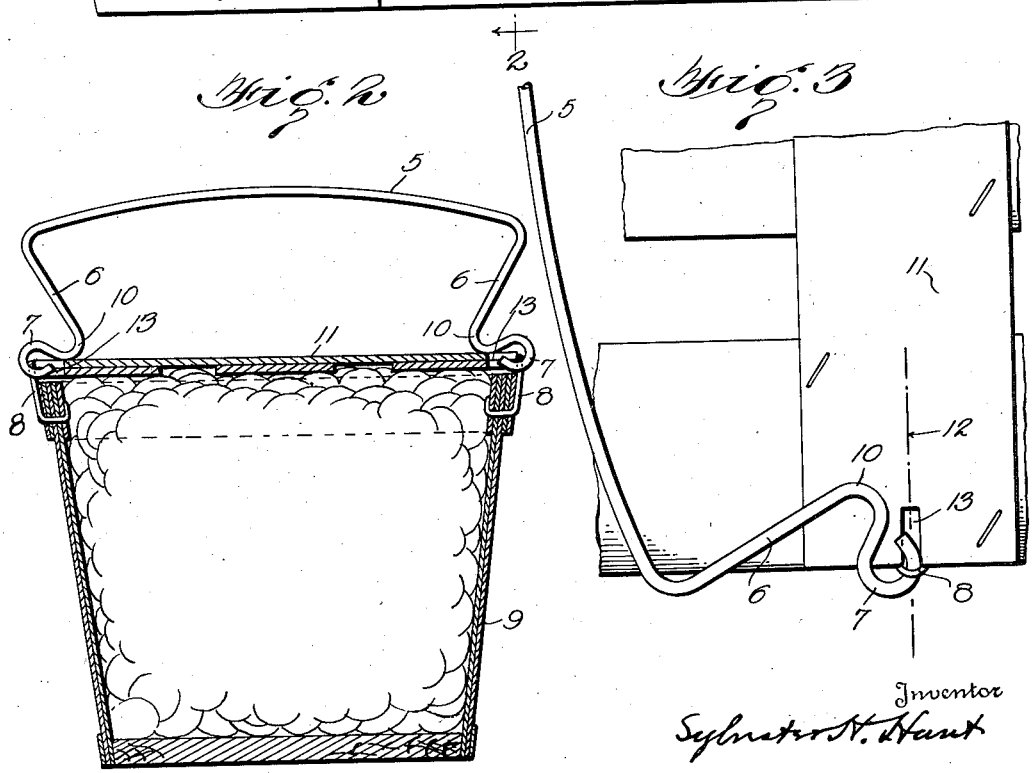
Inventor
Sylvester H. Hunt
Davis & Davis
By
Attorneys Patented Nov. 5, 1935

2,020,186

UNITED STATES PATENT OFFICE 2,020,186

SHIPPING BASKET

Sylvester H. Hunt, Norfolk, Va., assignor to Farmers Manufacturing Company, Norfolk, Va., a corporation of Virginia Application November 2, 1933, Serial No. 696,423

1 Claim. (Cl. 217—125)

This invention relates to that type of packing and shipping basket which is constructed of a light wooden body, a cover of light wood and a spring-wire handle pivotally connected to the body at opposite sides thereof and adapted to lie down flat upon the cover to permit the packed baskets to be stacked one upon the other; and the object of the present invention is to so construct the spring-wire handle that when the basket is packed and there is therefore more or less of an upward pressure on the cover (due to the upward pressure of the contents of the basket) this upward pressure will be utilized to automatically swing the handle to a position more or less upright, so that whenever there is no load upon the top of the basket the handle will always be in a position for easy grasping, as more fully hereinafter set forth.

In the drawing annexed:

Fig. 1 is a side elevation of a basket provided with my improved handle;

Fig. 2 is a vertical transverse sectional view thereof take along the pivotal line of the handle; and Fig. 3 is an enlarged plan view of a portion of the top of the basket showing the handle lying down flat thereon.

The spring-wire handle consists of the usual upwardly bowed grasping member 5 having each end portion bent downwardly to form a leg member 6 whose extreme lower end is curled to form an eye 7 which opens inwardly to adapt it to be engaged in the usual staple-ear 8 anchored in the rim portion of the basket 9 and extending a short distance above the upper edge of said rim portion. The handle is of course detachable from the basket body by simply spreading the legs 6 far enough to disconnect one or both of the eyes 7 from the staple-ears 8, and in applying the handle to the basket the same course of procedure is followed.

Each of the legs 6 is bent inwardly at a point adjacent the eye 7 to form an inwardly projecting lever 10 independent of said eye and whose innermost end makes contact with the basket top 11 at a point to one side or the other (when the handle is lying flat on the cover as shown in Fig. 3) of the transverse pivotal line or axis of the handle, this line being shown in Fig. 3 by the dot-dash line 12. By thus providing each of the members or legs 6 with what may be termed a lever 10, and so arranging that it shall make contact with the upper face of the basket cover, it will be seen that when the basket is packed and there is more or less of an upward pressure on the basket cover, this pressure will be communicated to the lever 10 and thus cause the handle to swing to or toward an upright position, convenient for grasping. It will also be observed that in view of the springiness of the handle as a whole and also possibly to a slight extent in view of the yieldingness of the cover when resting upon packed fruits such as grapes the handle may be readily pressed down to a flat position on top of the cover to thereby permit the loaded baskets to be readily stacked, just as though the handle were made in the usual manner. It will be observed that it is essential that the lever member 10 shall be off center, i. e., shall when pressed down to a flat position contact with the basket cover at a point to one side or the other of the pivotal line 12 of the handle as otherwise the upward pressure of the cover would not be exerted to swing the handle on its pivotal points. It will be observed that the lever members 10 must lie in the plane of the handle proper so that the handle may lie flat against the cover when the basket is either loaded or unloaded. Also, it will be observed that it is essential that the hinge members 7 and 8 must be so positioned that the transverse pivot axis of the handle shall be coincident with the cover so as to bring the inner ends of the levers 10 as close to the top face of the cover as possible so that these inner ends will be pressed against by the cover when the cover is bulged upwardly by the packed-in contents, it being the universal practice to pack this type of basket sufficiently full to press upwardly on the cover.

The basket cover is provided with the usual notches 13 in its opposite edges to accommodate the inwardly turned ends of the eyes 7 so that these ends shall lie in these notches when the handle is in more or less of an upright position and thus serve to prevent the cover from being endwisely displaced.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means.

I claim:

In a shipping basket, a basket body, a cover for said body having diametrically inwardly extending notches, upstanding ears on opposite sides of the basket body and extending upwardly outside the peripheral edges thereof and in alinement with the notches of the cover, and a bail-shaped handle having pivotal eyes which engages said upstanding ears and a portion independent of the pivoted eyes and forming a lever for automatically lifting the handle by the cover when pressure beneath the cover lifts the same, and said pivotal eyes being each formed with an underlying terminal which is shorter than the length of said cover notches, whereby said underlying terminal will turn into and lie entirely in the notches to prevent longitudinal shifting of the cover when the handle is in carrying position.

SYLVESTER H. HUNT.